Feb. 11, 1958 — H. B. BARRETT — 2,822,650
BRAKE SHOE GRINDERS
Filed Dec. 8, 1955 — 2 Sheets-Sheet 2
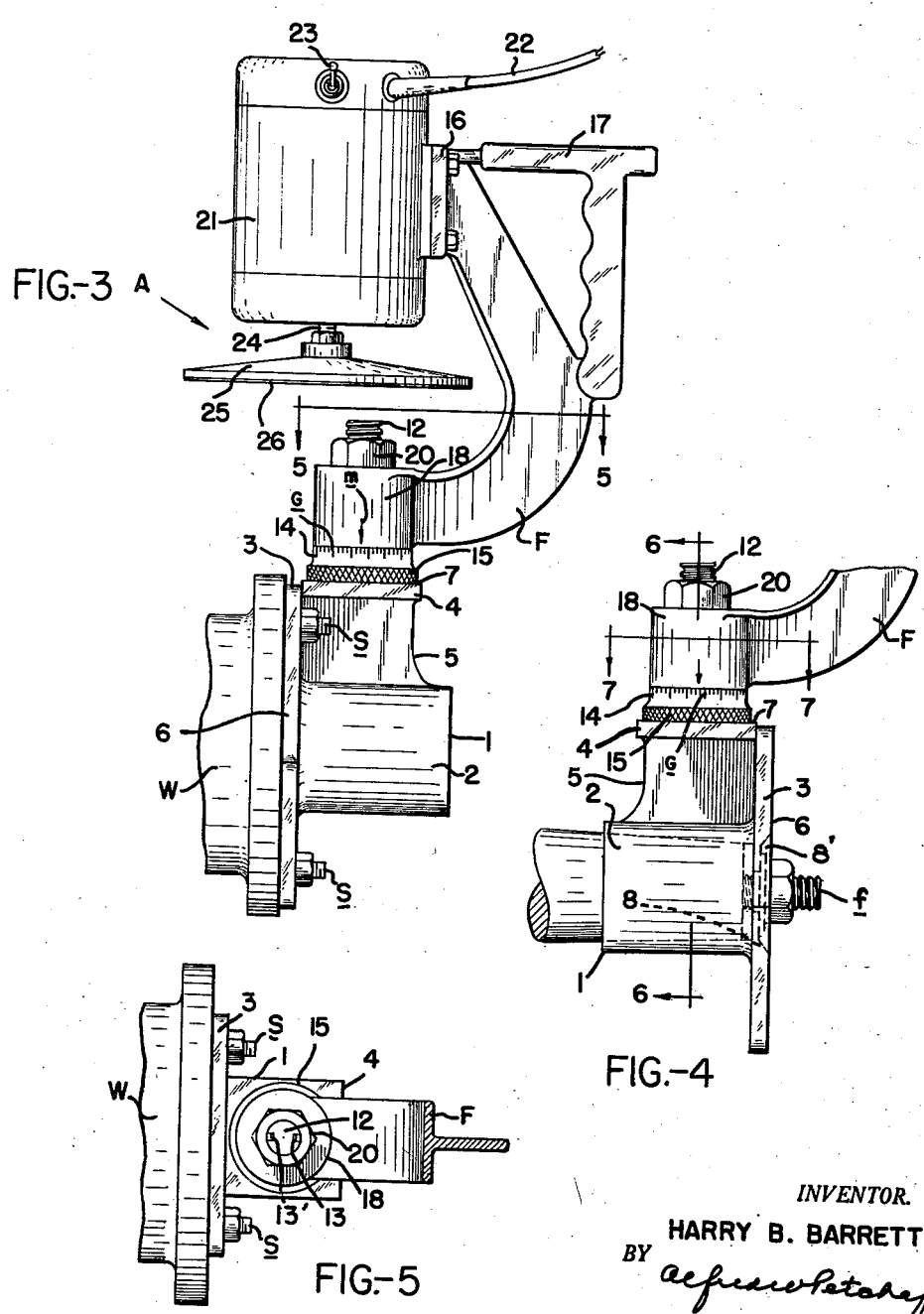
INVENTOR.
HARRY B. BARRETT
ATTORNEY

United States Patent Office 2,822,650
Patented Feb. 11, 1958

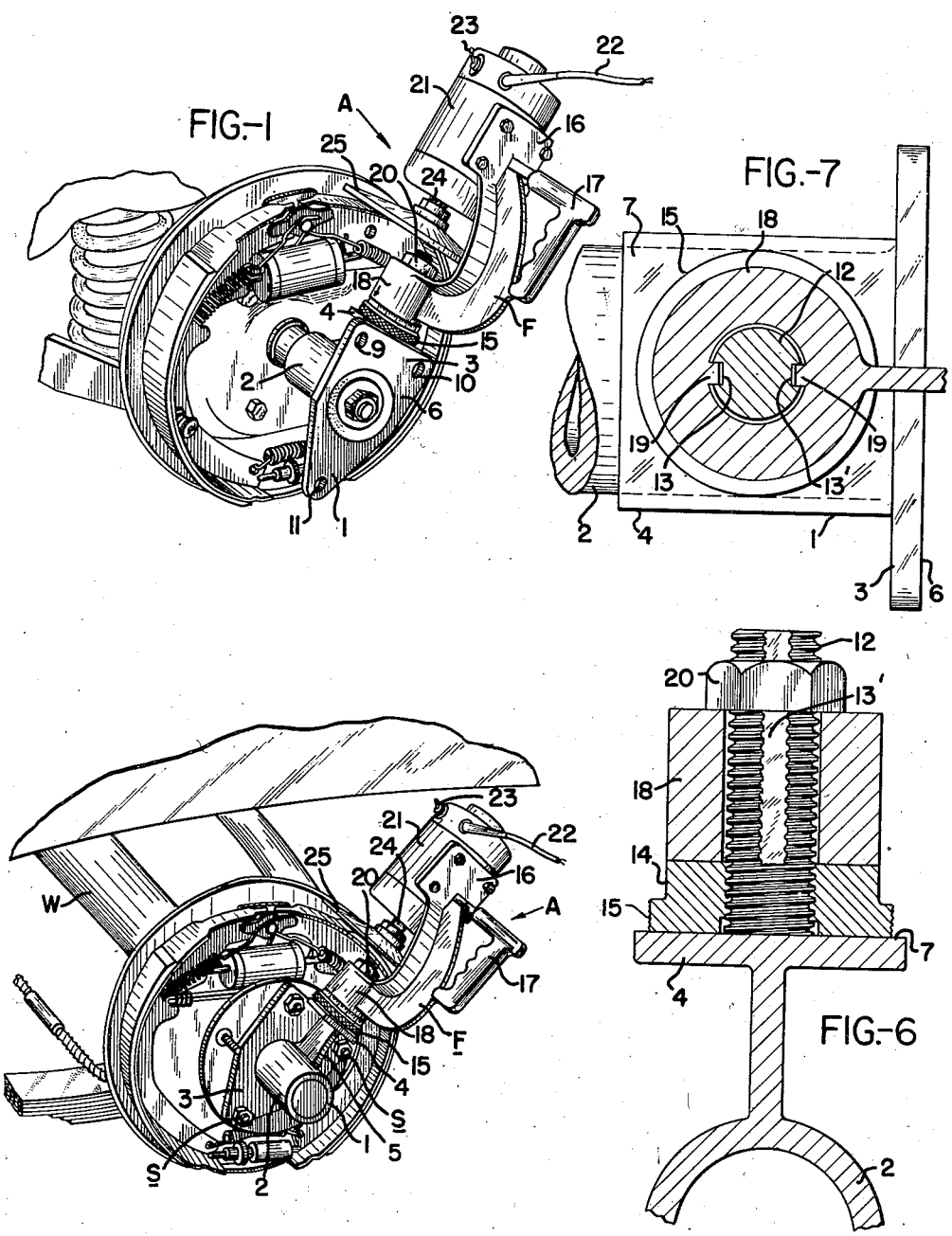

2,822,650

BRAKE SHOE GRINDERS

Harry B. Barrett, Clayton, Mo.

Application December 8, 1955, Serial No. 551,840

14 Claims. (Cl. 51—241)

This invention relates in general to certain new and useful improvements in brake shoe grinders and, more particularly, to a brake shoe grinder which is adapted for specific types of automobiles.

The application of automatic transmissions in the low-priced car field and a radical change in the design of the so-called "Bendix" brake, which is widely used in this field, have created a serious brake servicing problem. As is well known, automatic transmissions impose severe wear and tear on automotive brake systems, so that more frequent servicing and repair becomes necessary. At the same time, the current adoption and use of stationary anchors in brake systems necessitates concentric grinding while the shoes are mounted on the backing plate inasmuch as the procedure becomes the only practical method of shoe centralization. Such work, therefore, must be done as quickly and economically as possible with a grinding tool that is precise and yet will involve a minimum of adjustments, settings and accessories.

It is, therefore, the primary object of the present invention to provide a brake grinder which can be mounted directly upon the automobile axle spindle or wheel and rotated concentrically with respect thereto.

It is another object of the present invention to provide a brake shoe grinder which will grind a precisely concentric surface upon a brake shoe with a minimum of settings or adjustments and can be very quickly and conveniently operated by the average automotive mechanic with very simple training or instruction.

With the above and other objects in view, my invention resides in the novel features of form, construction, arrangement, and combination of parts presently described and pointed out in the claims.

In the accompanying drawings (two sheets)—

Figures 1 and 2 are perspective views, respectively, of front and rear wheel brake assemblies showing the installation thereon of a brake shoe grinder constructed in accordance with and embodying the present invention;

Figure 3 is a side elevational view of the brake shoe grinder operatively mounted on the rear wheel assembly of an automobile;

Figure 4 is a fragmentary side elevational view of the brake shoe grinder operatively mounted on a front wheel axle spindle;

Figure 5 is a fragmentary sectional view taken along line 5—5 of Figure 3; and

Figures 6 and 7 are sectional views taken along lines 6—6 and 7—7 respectively, of Figure 4.

Referring now in more detail and by reference characters to the drawings, which illustrate a practical embodiment of the present invention, A designates a brake shoe grinder comprising a wheel mounting bracket 1 integrally including a sleeve 2, an abutment plate 3, and a shoulder plate 4 connected by a reinforcing web 5. The abutment plate 3 and shoulder plate 4 are respectively provided with precisely machined outwardly presented contact faces 6, 7, which are perpendicular to each other and the contact face 7 is furthermore parallel to the longitudinal axis of the sleeve 2, the latter being provided at one end with a tapered counter-bore 8, which is adapted to receive a matching washer 8', by which the sleeve can be adapted to fit a conventional tapered front axle-spindle f.

The abutment plate 3 is preferably somewhat triangular in peripheral contour and is provided with three apertures 9, 10, 11, all of which are located at equal radial distances outwardly from the longitudinal center line of the sleeve 2 and are sized for snug-fitting but slidable disposition over the tire mounting studs s of the automobile wheel assembly W, all as best seen in Figures 2 and 3.

Mounted rigidly in, and extending outwardly from, the shoulder plate 4 is a grinder-frame supporting post 12 which is externally provided with a heavy, precise, and structurally strong thread, such as, for instance, an acme thread, and is milled longitudinally to provide two external diametrally opposite axle key-ways 13, 13'. In this connection it should be noted that the longitudinal axis of the post 12 is perpendicular to the contact face 7 of the shoulder plate 4 and the key-ways 13, 13', are located along a diametral line across the post 12, which diametral line is parallel to the longitudinal axis of the sleeve 2.

Threadedly mounted on the post 12 directly adjacent to the shoulder plate 4 is a collar-nut 14 which is provided with a diametrally enlarged rim 15, the outer surface of which is knurled. Above the rim 15, the surface of the collar-nut 14 is smooth and is provided with a series of graduations g which are related to the pitch of the acme thread on the post 12, so that, as the collar-nut 14 is rotated on the post 12, the graduations g will serve as a measure of the amount of longitudinal translation of the collar-nut 14 toward and away from the contact face 7, for purposes presently more fully appearing.

Provided for reversible disposition upon the mounting bracket 1 is a yoke-shaped grinder-frame F integrally including a mounting pad 16, a handle 17, and a sleeve 18, the latter being bored for snugfitting, axially slidable engagement upon the post 12 of the mounting bracket 1 and being internally provided with key-forming tongues 19. It should be noted in this connection that the axial length of the sleeve 18 is somewhat shorter than the axial length of the post 12, so that the latter will protrude from the sleeve 18 for receiving a securement nut 20. Furthermore, the sleeve 18 is inscribed upon its external face with an index graduation g or zero mark m.

Bolted or otherwise rigidly secured upon the mounting pad 16 is an electric grinder 21 having a conventional electrical connector cord 22, toggle switch 23, and grinder shaft 24, the latter being removably provided with a disk-shaped grinder plate 25 having an abrasive disk 26 adhesively or otherwise suitably secured to its exposed face.

In use, the brake shoe grinder A may be mounted upon the axle spindles of a front wheel assembly substantially in the manner shown in Figure 1, in which case the mounting bracket 1 will be fastened to the grinder-frame F, so that the abutment plate 3 will be faced outwardly, as shown in Figure 4. If the brake lining is to be ground to the so-called "normal" size, the nut 20 is loosened slightly and the collar-nut 14 adjusted so that its "0" or zero graduation is in line with the index mark m of the sleeve 18. The nut 20 may then be tightened down so that the frame F will be locked securely in such position. If, however, the brake shoe is to be ground several thousandths oversize or undersize, the nut 20 may be loosened and the collar-nut 14 turned either clockwise or counterclockwise, as the case may be, so as to shift the sleeve 18 toward or away from the contact face 7 by the required amount as indicated by the particular graduation g which is brought into alignment with the index mark m. When the desired oversize or undersize adjustment has been made, the nut 20 is tightened down to hold the frame F rigidly in such adjusted position.

Similarly, the grinder A may be mounted on a rear wheel assembly substantially as shown in Figure 2, and to accomplish this type of mounting the nut 20 is removed so that the mounting bracket 1, together with the post 12 and collar-nut 14, can be bodily removed from the sleeve 18 of the frame F. Upon being removed, the mounting bracket 1 is turned end for end, that is to say, through 180°, and the post 12 is reinserted into the sleeve 18, the key-forming tongues 19 again becoming engaged in the key-ways 13, 13'. In this position, the mounting bracket 1 and frame F assume the relative position shown in Figure 3 and in this position "normal," oversize, or undersize adjustments can be obtained in the same manner as previously described.

When in operative position on either the front wheel or rear wheel assemblies, the electrical connector cord 22 can be plugged into any conventional source of electrical current and the toggle switch 23 closed to energize the grinder and rotate the grinder plate 25. With the grinder plate rotating, the frame F is swung to and fro in a circumferential arc to grind a truly concentric surface upon the braking surfaces of the brake shoes.

It should be understood that changes and modifications in the form, construction, arrangement, and combination of the several parts of the brake shoe grinder may be made and substituted for those herein shown and described without departing from the nature and principle of my invention.

Having thus described my invention, what I claim and desire to secure by Letters Patent is:

1. A brake grinder comprising a hub having an internal bore adapted for rotative engagement upon an axle-spindle, a flat plate forming a part of said hub and having a contact face perpendicular to the longitudinal axis of the bore for optional securement to the wheel mounting lugs of a rear wheel assembly, a flat shoulder forming part of the hub and being located in outwardly spaced relation to the bore, said shoulder having a contact face which is angularly disposed to the contact face of the plate, a grinder frame swingably and adjustably mounted on said shoulder, and grinder means rigidly mounted on the outer end of the frame.

2. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a grinder frame mounted on said shoulder for adjustable movement radially toward and away from said shoulder, and grinder means rigidly mounted on the outer end of the frame.

3. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a grinder frame mounted on said shoulder, said grinder frame also being optionally positionable through an arc of 180° around an axis perpendicular to said shoulder, and grinder means rigidly mounted on the outer end of the frame.

4. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a grinder frame mounted on said shoulder for adjustable movement radially toward and away from said shoulder, said grinder frame also being optionally positionable into two positions through an arc of 180° around an axis which is radial with respect to the longitudinal axis of the bore, and grinder means rigidly mounted on the outer end of the frame.

5. A brake grinder comprising a hub having an internal bore adapted for rotative engagement upon an axle-spindle, a plate forming part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a grinder frame mounted on said shoulder, means interposed between the shoulder and the grinder frame for adjustably moving said grinder frame radially toward and away from said shoulder, and grinder means rigidly mounted on the outer end of the frame.

6. A brake grinder comprising a hub having an internal bore adapted for rotative engagement upon an axle-spindle, a plate forming part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a grinder frame mounted on said shoulder, means interposed between the shoulder and grinder frame for adjustably moving said grinder frame radially toward and away from said shoulder, said grinder frame also being positionable through an arc of 180° around an axis perpendicular to said shoulder, and grinder means rigidly mounted on the outer end of the frame.

7. A brake grinder comprising a hub having an internal bore adapted for rotative engagement upon an axle-spindle, a plate forming part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a grinder frame mounted on said shoulder, means interposed between the shoulder and the grinder frame for adjustably moving said grinder frame radially toward and away from said shoulder, said grinder frame also being optionally positionable into two positions through an arc of 180° around an axis which is radial with respect to the longitudinal axis of the bore, and grinder means rigidly mounted on the outer end of the frame.

8. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a threaded stud mounted in and projecting outwardly from the shoulder in radial relation to the hub, a pair of nuts operatively mounted in axially spaced relation on the stud, a grinder frame provided at one end with a tubular sleeve which is rotatably mounted on the stud and is held between said pair of nuts in any one of several positions of adjustment along said stud, whereby the radial distance between the grinder frame and the hub can be varied, and grinder means rigidly mounted on the other end of said frame.

9. A brake grinder comprising a hub having an internal bore adapted for rotative engagement upon an axle-spindle, a plate forming part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a threaded stud mounted in and projecting outwardly from the shoulder in radial relation to the hub, a pair of nuts operatively mounted in axially spaced relation on the stud, a grinder frame provided at one end with a tubular sleeve which is rotatably mounted on the stud and is held between said pair of nuts in any one of several positions of adjustment along said stud, whereby the radial distance between the grinder frame and the hub can be varied, and grinder means rigidly mounted on the other end of said frame.

10. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a threaded stud mounted in and projecting outwardly from the shoulder in radial relation to the hub, a calibrated collar and a nut mounted in axially spaced relation on the stud, a grinder frame provided at one end with a tubular sleeve which is rotatably mounted on the stud and is held between said calibrated collar and nut in any one of several positions of adjustment along said stud, whereby the radial distance between the grinder frame and the hub can be varied, and grinder means rigidly mounted on the other end of said frame.

11. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a threaded stud mounted in and projecting outwardly from the shoulder in radial relation to the hub, a pair of nuts operatively mounted in axially spaced relation on the stud, a grinder frame provided at one end with a tubular sleeve which is rotatably mounted on the stud and is held between said pair of nuts in any one of several positions of adjustment along said stud, whereby the radial distance between the grinder frame and the hub can be varied, means for holding the sleeve in either of two optional positions on the stud which positions are 180° from each other around the stud, and grinder means rigidly mounted on the other end of said frame.

12. A brake grinder comprising a hub having an internal bore adapted for rotative engagement upon an axle-spindle, a flat plate forming a part of said hub and being perpendicular to the longitudinal axis of the bore for optional securement to the wheel mounting lugs of a rear wheel assembly, a flat shoulder forming part of the hub and being located in outwardly spaced relation to the bore, said shoulder being perpendicular to the plate, a threaded stud mounted in and projecting outwardly from the shoulder in radial relation to the hub, a pair of nuts operatively mounted in axially spaced relation on the stud, a grinder frame provided at one end with a tubular sleeve which is rotatably mounted on the stud and is held between said pair of nuts in any one of several positions of adjustment along said stud, whereby the radial distance between the grinder frame and the hub can be varied, said stud being provided with two axial key-ways located at 180° from each other around the stud, a tongue on the sleeve for optional engagement in either of said key-ways for holding the frame in one of two different positions in relation to the plate while permitting the frame to be axially adjusted along the stud, and grinder means rigidly mounted on the other end of said frame.

13. A brake grinder comprising a hub having an internal bore adapted for rotative engagement upon an axle-spindle, a plate forming part of said hub and being perpendicular to the longitudinal axis of the bore for optional securement to the wheel mounting lugs of a rear wheel assembly, means associated with said hub and having an outwardly presented flat abutment shoulder, said shoulder being located in outwardly spaced relation to the bore and being perpendicular to the plate, a grinder frame swingably and adjustably mounted on said shoulder, and grinder means mounted on the outer end of the frame.

14. A brake grinder comprising a hub having an internal bore adapted for rotative engagement upon an axle-spindle, a plate forming part of said hub and being perpendicular to the longitudinal axis of the bore for optional securement to the wheel mounting lugs of a rear wheel assembly, means associated with said hub and having an outwardly presented flat abutment shoulder, said shoulder being located in outwardly spaced relation to the bore and being perpendicular to the plate, a grinder frame mounted on said shoulder for adjustable movement radially toward and away from said shoulder, and grinder means rigidly mounted on the outer end of the frame.

References Cited in the file of this patent

UNITED STATES PATENTS

| | | |
|---|---|---|
| 1,927,898 | Myers et al. | Sept. 27, 1933 |
| 1,996,252 | Miller et al. | Apr. 2, 1935 |
| 2,140,580 | Hatchman | Dec. 20, 1938 |
| 2,187,962 | Barrett | Jan. 23, 1940 |
| 2,295,061 | Thomason | Sept. 8, 1942 |

FOREIGN PATENTS

| | | |
|---|---|---|
| 136,003 | Australia | Jan. 23, 1950 |
| 902,501 | France | Dec. 15, 1944 |